United States Patent
Kopp et al.

[11] Patent Number: 5,933,845
[45] Date of Patent: *Aug. 3, 1999

[54] FLASH MEMORY MANAGEMENT METHOD INCLUDING SHIFTING OR COPYING DATA TO OTHER BLOCKS TO OPTIMIZE STORAGE SPACE AND ALLOW ENTIRE BLOCKS TO BE ERASED

[75] Inventors: Dieter Kopp, Hemmingen; Jürgen Sienel, Leonberg, both of Germany

[73] Assignee: Alcatel Sel Aktiengesellschaft, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/536,852

[22] Filed: Sep. 29, 1995

[30] Foreign Application Priority Data

Sep. 30, 1994 [DE] Germany ............................. 44 35 042
Nov. 26, 1994 [DE] Germany ............................. 44 42 127

[51] Int. Cl.$^6$ ........................... G06F 12/02; G06F 13/00; G11C 16/00
[52] U.S. Cl. ..................... 711/103; 711/171; 711/165; 365/185.29; 365/185.33; 707/206
[58] Field of Search .................................... 395/430, 612, 395/621, 622, 492; 365/185.11, 185.29, 185.33, 218; 711/103, 165, 170, 171; 707/205, 206, 101

[56] References Cited

U.S. PATENT DOCUMENTS

| | | | |
|---|---|---|---|
| 5,305,276 | 4/1994 | Uenoyama | 365/185.11 |
| 5,341,339 | 8/1994 | Wells | 365/230.01 |
| 5,442,768 | 8/1995 | Sudoh et al. | 711/103 |
| 5,473,569 | 12/1995 | Chwu | 365/185.11 |
| 5,535,356 | 7/1996 | Kim et al. | 711/103 |
| 5,544,356 | 8/1996 | Robinson et al. | 711/103 |

FOREIGN PATENT DOCUMENTS

| | | |
|---|---|---|
| 0542156 | 5/1993 | European Pat. Off. . |
| 0548681 | 6/1993 | European Pat. Off. . |

*Primary Examiner*—Glenn Gossage
*Attorney, Agent, or Firm*—Ware, Fressola, Van Der Sluys & Adolphson LLP

[57] ABSTRACT

A method of operating a flash memory which can be recorded in "byte" o in "word" form, but can only be erased in blocks, is disclosed. A memory optimization algorithm is used where the degree of filling of the individual blocks in the flash memory is determined and compared to a threshold. According to the degree of filling, data are shifted to the end of the memory, or it is determined whether an entire block can be erased, or whether copying can take place into open areas of blocks within the memory so that an entire block can be erased, or whether files can be temporarily stored in areas marked for erasure and reconstructed after the block has been erased, or if files can be overwritten to areas marked for erasure by means of a linkage. In the event that optimization is not possible, a user inquiry may be made.

19 Claims, 4 Drawing Sheets

FLASH MEMORY MANAGEMENT METHOD INCLUDING SHIFTING OR COPYING DATA TO OTHER BLOCKS TO OPTIMIZE STORAGE SPACE AND ALLOW ENTIRE BLOCKS TO BE ERASED

TECHNICAL FIELD

The invention concerns a method for managing flash memory units.

BACKGROUND OF THE INVENTION

So-called flash memories are known in the state of the art, particularly for use in digital telephone answering machines. A flash memory is a continuous, linear data storage. Known flash memories, e.g. from the INTEL Corporation (Santa Clara, Calif., have a 4 megabit (Mbit) memory divided into seven different size blocks. Memories from the Advanced Micro Devices (AMD) Company (Sunnyvale, Calif.) are divided into eight blocks. The flash memory from the INTEL Corporation can be combined into four blocks of equal size. In both of these known flash memories it is only possible to erase entire blocks. With a maximum storage time of 15 minutes e.g. and a subdivision into four blocks, this means that more then 3 minutes are stored in each block. To erase an entire block therefore, all messages that were recorded during these 3 minutes must be eliminated.

It is a disadvantage that all messages must be erased and that each new recording and erasing of a block also reduces the service life of the memory. Most flash memories have an average service life of 100,000 record-erase cycles per block.

SUMMARY OF THE INVENTION

The invention has the task of providing a flash memory management whereby extensive loading of the available storage space is possible.

Another task of the invention, in addition to the extensive loading, is to provide a flash memory management that is user friendly. This is achieved by a method for operating a flash memory, which is divided into blocks, and where the blocks are subdivided into a plurality of segments, wherein data are stored in the form of files in segments and files are marked for erasure in segments, the method comprising the steps of determining an up-to-date degree of filling for the flash memory, wherein the number of occupied segments marked for erasure, and the number of unmarked and unoccupied segments are determined for each block, and performing a memory optimization after a degree of filling threshold has been exceeded.

It is also achieved by a memory encoded with executable instructions representing a program module for the operation of a flash memory divided into blocks, and whose blocks are subdivided into a number of segments, by which a computer is instructed to determine an allowable degree of flash memory filling by the number of unoccupied, occupied and marked for erasure segments, and through occupied and unmarked segments of each block, and a memory optimization is then performed by means of control commands, the control commands comprising: (1) a first such control command causes segments occupied by files to be shifted, and (2) a second such control command erases remaining occupied segments which are marked for erasure, or (3) a third such control command wherein a block is determined in which no occupied and unmarked segments are located, which is then erased, or wherein a fourth control command causes determination of the block containing the smallest number of occupied unmarked segments and copying of the occupied unmarked segments to unoccupied segments of other blocks, or wherein a fifth control command causes determination of the block containing the smallest number of occupied unmarked segments and temporary storage of the occupied unmarked segments in marked segments of other blocks, and causes the erasure of the determined block, and causes reconstruction of the occupied unmarked segments or wherein a sixth control command causes a user inquiry, in which the user can mark files for erasure.

A further task of the invention is achieved by the use of such a memory encoded with executable instructions representing a program module for optimizing the storage of voice messages, particularly in a telephone answering machine. A still further task of the invention is achieved by a computer-readable storage medium having a program or structured data recorded thereon for the operation of a flash memory divided into blocks, and whose blocks are subdivided into a plurality of segments, by which a computer is instructed to determine an allowable degree of flash memory filling through the number of unoccupied, occupied and marked for erasure segments, and through occupied and unmarked segments of each block, and a memory optimization is then performed by means of one or more of the following control commands, wherein a control command causes segments occupied by files to be shifted, and wherein the remaining occupied marked for erasure segments are erased by means of a control command, or wherein a block is determined in which no occupied and unmarked segments are located, which is then erased by means of a control command, or wherein a block containing the smallest number of occupied unmarked segments is determined, which are then copied to unoccupied segments of other blocks by means of a control command, or wherein the block containing the smallest number of occupied unmarked segments is determined, which are then temporarily stored in marked segments of other blocks by means of a control command, and are then reconstructed after the determined block has been erased, or wherein the block containing the smallest number of occupied unmarked segments is determined, which are then copied to marked-for-erasure segments of another block using a logic operation to combine data of the unmarked segments with data of the marked segments, and/or wherein another control command causes a user inquiry, in which the user can mark files for erasure.

It is an advantage that the record-erase cycles can be applied to all blocks, so that the process of erasing blocks itself is subject to optimization.

It is furthermore advantageous that by copying within the memory, the optimization keeps the time in which the memory is occupied (filled) and no new message can be recorded very short. Further advantageous configurations of the invention can be found in the dependent claims.

BRIEF DESCRIPTION OF THE DRAWINGS

In the following, the invention will be explained in greater detail by means of the figures.

BEST MODE FOR CARRYING OUT THE INVENTION

A flash memory is divided into a number of blocks. These blocks in turn are subdivided into a number of segments.

According to the invention, data in the form of files can be stored in segment form starting with any segment of the flash memory. To erase these respective files, they are marked in segments, but the erasure can only take place in blocks.

In the following, a flash memory that is divided into four blocks is given as an example. As another possibility, a flash memory can also be divided into eight blocks, or even into sixteen blocks. This depends on the respective semiconductor manufacturer.

Figure 1:
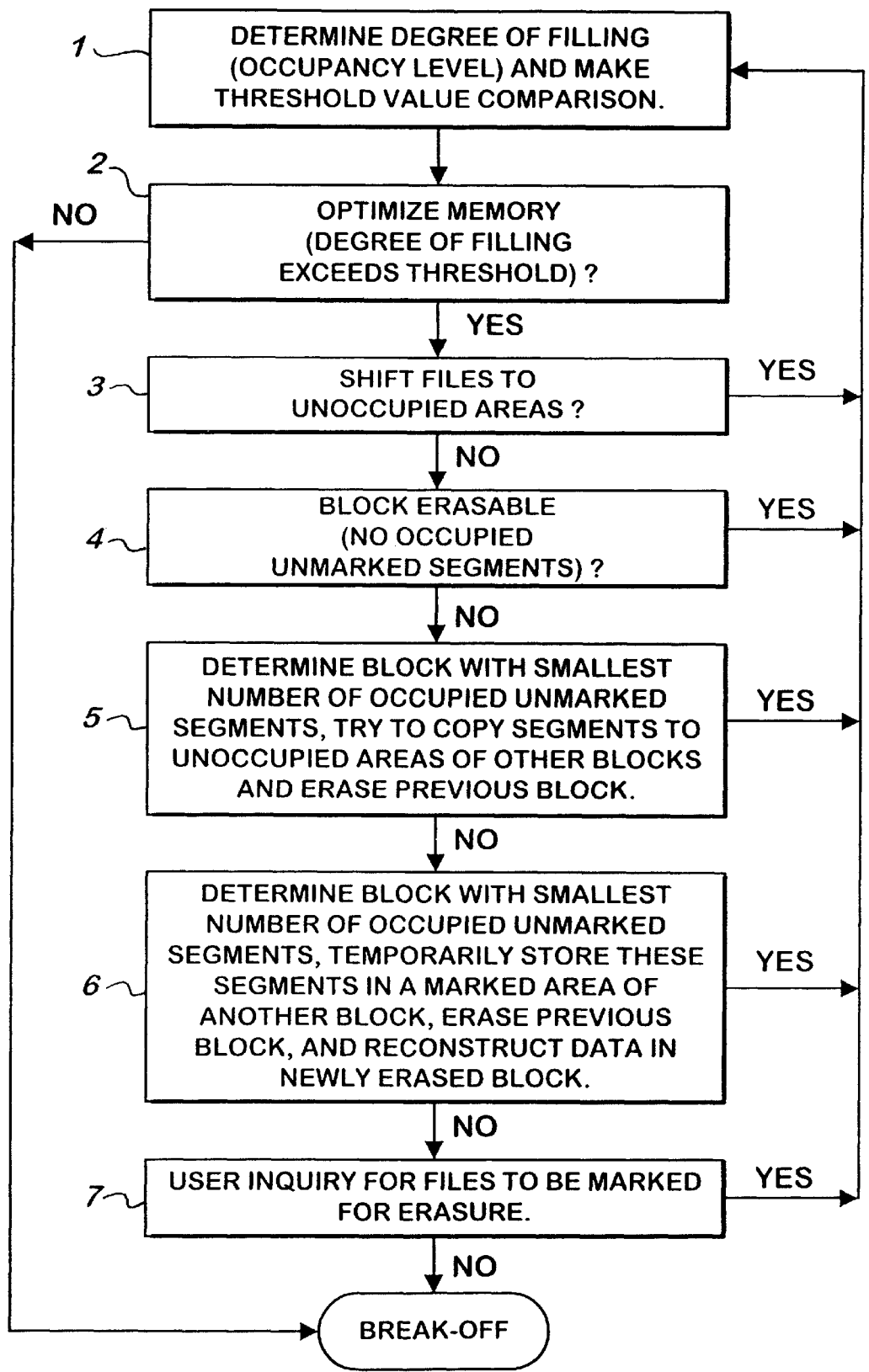
FIG. 1 is a flow diagram of a memory optimization.

As shown in FIG. 1, an up-to-date degree of flash memory filling is determined in a first step 1. This takes place by determining the number of unoccupied segments, the number of occupied marked for erasure segments and the number of unmarked occupied segments of each block. The degree of filling of the individual blocks and the degree of filling of the entire flash memory leads to the performance of a memory optimization after a threshold has been exceeded. The threshold may be an empirically determined value, which e.g. is adjustable. It can also be envisioned to provide different, i.e. variable thresholds according to the degree of filling.

In step 2, a determination is made as to whether optimization is required. If the degree of filling is above the threshold, the requirement to optimize the memory exists. According to the configuration of the invention, this can be achieved by shifting occupied unmarked files in the direction of the respective unoccupied end of the memory (step 3). The marked files remaining in the original block are erased in block form. In the event that file shifting is not possible, another step 4 can determine whether a whole block exists in which no occupied unmarked segments are located. The entire block is then erased.

In the event that no entirely erasable block is located in the flash memory, the block containing the smallest number of occupied unmarked segments is determined. These occupied unmarked segments, which belong to a file, are then copied to unoccupied areas of other blocks (step 5). The previously determined block is then erased. The present case assumes that the file being copied fits entirely into the unoccupied area, and thus stays together as a whole.

If no possibility exists to copy segments into unoccupied areas of other blocks, the block containing the smallest number of occupied unmarked segments is again determined in another step 6, whereupon these segments of the determined block are temporarily stored in a marked area of another block. After that, the previously determined block is erased as a whole, and the temporarily stored data are rewritten to the now fully unoccupied block.

In the event the invention performs one of these four steps 3, 4, 5, 6 for optimization of the memory, the degree of filling is again determined and a comparison of threshold values takes place (step 1).

In the event none of these preceding steps is performed, thus an optimization is not possible, a user inquiry takes place in another step 7. In this case the user is asked for the files that must be additionally marked for erasure. If the user gives a positive reply, thus establishes erasable files, step 1 may again be performed. In the event the user does not wish to erase any other segment, a "break-off" takes place and no new file can be stored.

Figure 2:
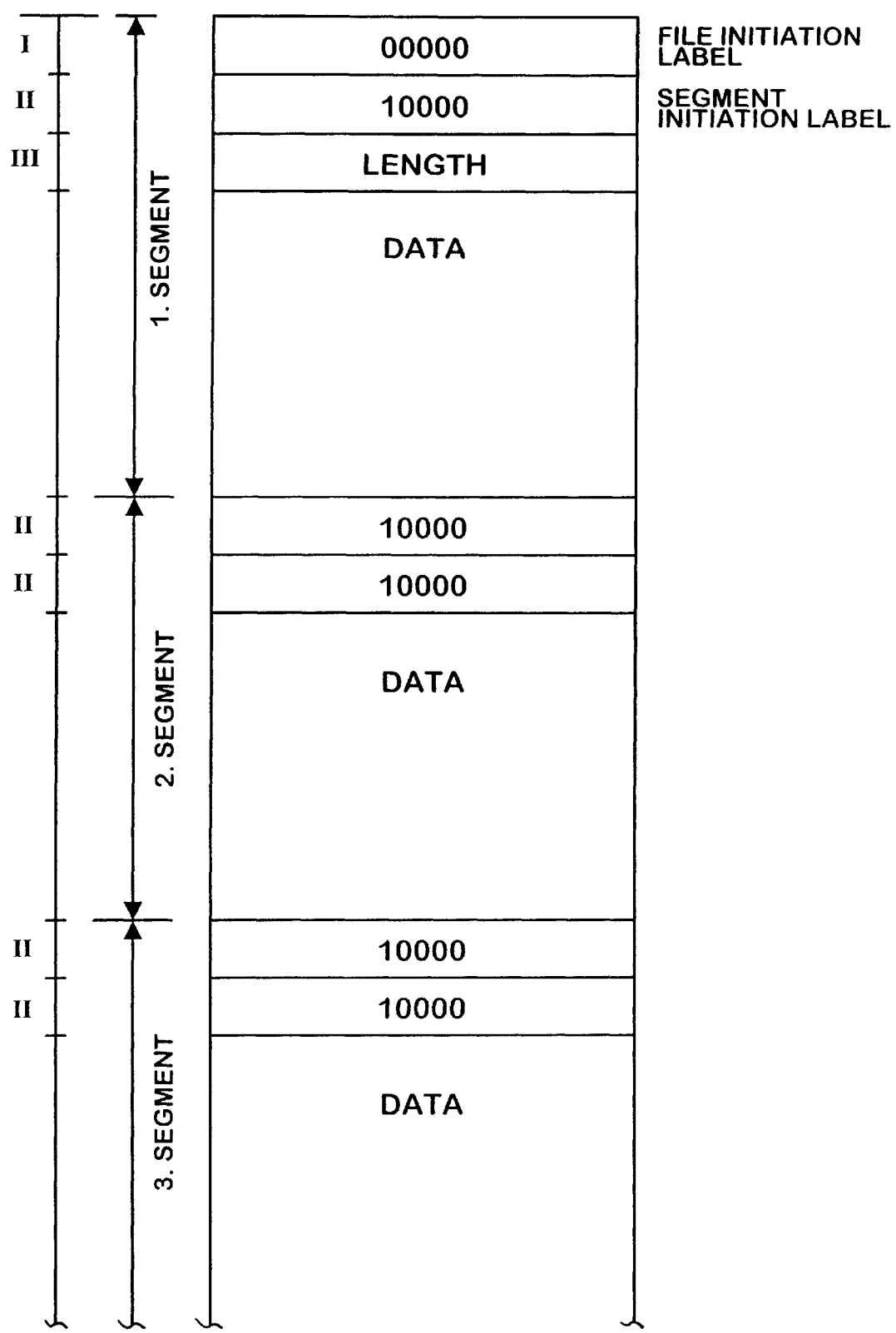
FIG. 2 is a schematic illustration of a file.

The schematic illustration of a file containing several segments is explained in the following by means of FIG. 2. A file initiation label 00000 is located at the start of each file in an area I, which contains zeros for example. The second area II is a segment initiation label, e.g. 10000, at the start of each file. At the start of the second segment, which is still part of the file, a segment initiation label 10000 is located twice. The same continues in this way for each other segment of the file. A new file initiation label 00000 is again provided for the start of a new file (not shown). This makes clear the length of an existing file.

Furthermore, at the start of a file, another area III for example contains the total length of the existing file to its end. As an option, the date, year and time of the file entry can also be recorded. After that, the data to be saved is stored in the remaining area or areas. This clearly establishes which segments are occupied. To mark a file for erasure, a zero is entered e.g. into all segment initiation labels II, thus 00000. This clearly establishes that the data stored therein are ready for erasure. A code in the segment initiation label II can establish which type of data are stored therein; for example pulse code modulation (PCM) data or adaptive differential pulse code modulation (ADPCM) data etc., which is indicated by a code 01000 or 00100.

In the following, a memory encoded with executable instructions representing a program module, herein referred to as "program module", is explained (without drawing) for the operation of a flash memory. The flash memory is also divided into blocks, which in turn are subdivided into a number of segments. An allowable degree of flash memory filling (occupancy level) is also determined, resulting from the number of unoccupied segments, the number of occupied segments marked for erasure, and the number of occupied unmarked segments of each block. A memory optimization then takes place by means of subsequent control commands. One control command causes segments containing files to be shifted, and another control command causes the erasure of a block with the remaining occupied segments marked for erasure. In the event that this cannot be accomplished, a block in which no occupied unmarked segments are located is determined, and the entire block is then erased by means of a control command. If this is not possible either, the block containing the smallest number of occupied unmarked segments is determined.

As a result of another control command, these are then temporarily stored in marked segments of other blocks. The block is erased and the temporarily stored segments are reconstructed in the block after the erasure. In case this cannot be accomplished either, the block containing the smallest number of occupied unmarked segments is determined. As a result of a control command, the occupied unmarked segments are copied. However, this only takes place if an entire file can be copied to an open memory area. In this case as well, if none of these optimizations is possible, another control command causes a user inquiry, whereby a user can additionally mark files for erasure.

A broad application of such program modules can be envisioned for example for storing voice messages in telephone answering machines. For example, a flash memory used in this case can store a number of messages, up to a total of 15 minutes e.g. There is often the desire to erase messages and to keep other messages for a longer time.

Figure 3A:
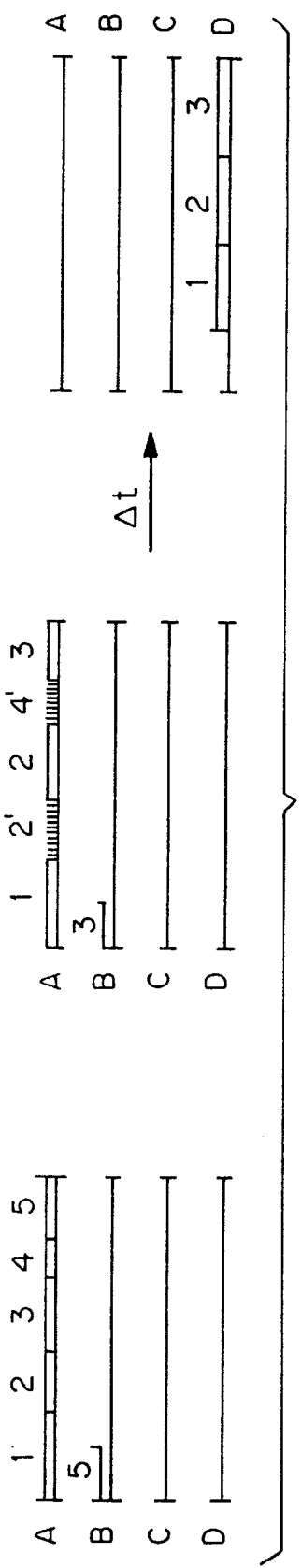
FIG. 3a is an example of file shifting.

In the following, a configuration example is explained in greater detail by means of FIG. 3a. In the example chosen here, the flash memory contains four blocks A, B, C, D. The marked areas of segments which are ready for erasure are indicated by short vertical lines (||||). Segments which are unmarked, which should therefore remain stored, are indicated by the long horizontal line. According to the invention, the sequence of files of the same type can be determined by evaluating additional information placed at the start of the first segment of a file (such as date and time).

Five different files 1, 2, 3, 4, 5 are stored in the first block A. The second block B only contains the end of the fifth file 5. Now, if e.g. files 2 and 4 are to be marked for erasure (see FIG. 3a, 2', 4'), then file 3 becomes file 2, and file 5 becomes file 3. In case files must be shifted, the unmarked files 1, 2, 3 are shifted to the end of the memory into the fourth block D. As already explained, the marking of the files is changed. File 5 becomes 3, 3 becomes 2 and 1 remains. Thus after shifting, files 1, 2, 3 are in the sequence 3, 2, 1 in the last block D. The marked files in the first block A are now erased in this block. This again makes three free blocks A, B and C available for renewed storage. New messages in the form of files are now again written into block A.

Figure 3B:
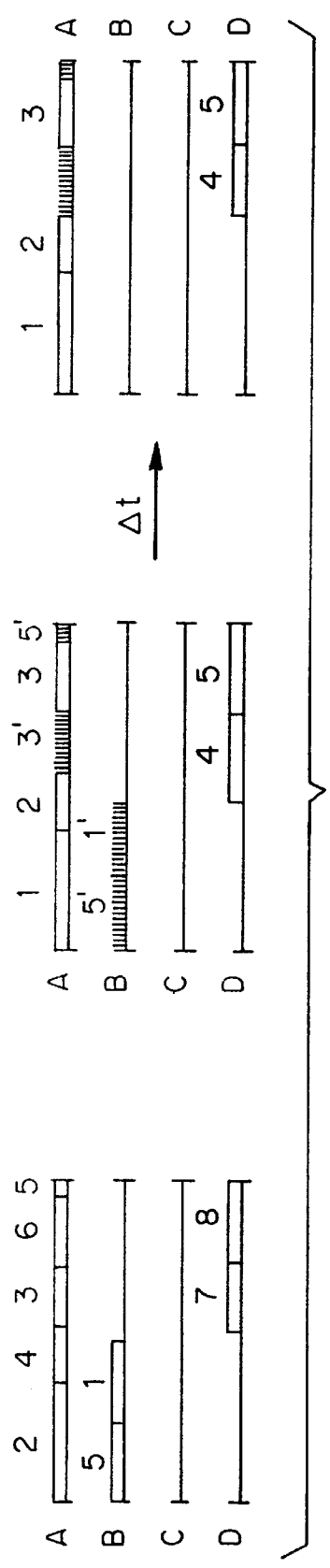
FIG. 3b is an example of erasing entire blocks.

In the following, the erasure of entire blocks is explained by means of FIG. 3b. There are five files 2, 3, 4, 5, 6 in block A. File 3 is marked for erasure (3'). The block B contains two files 5 and 1, both are marked for erasure (5', 1'). The block is not otherwise occupied. Block C is not occupied either. There are files 7, 8 in block D which must be retained. It is now determined that the block B is erasable. For example, the unoccupied part of the block can also be marked for erasure, whereupon the block is erased. Then only block A and D contain data. Thus 2 changed into 1, 4 changed into 2, 6 changed into 3, 7 changed into 4 and 8 changed into 5. Blocks B and C are free.

Figure 3C:
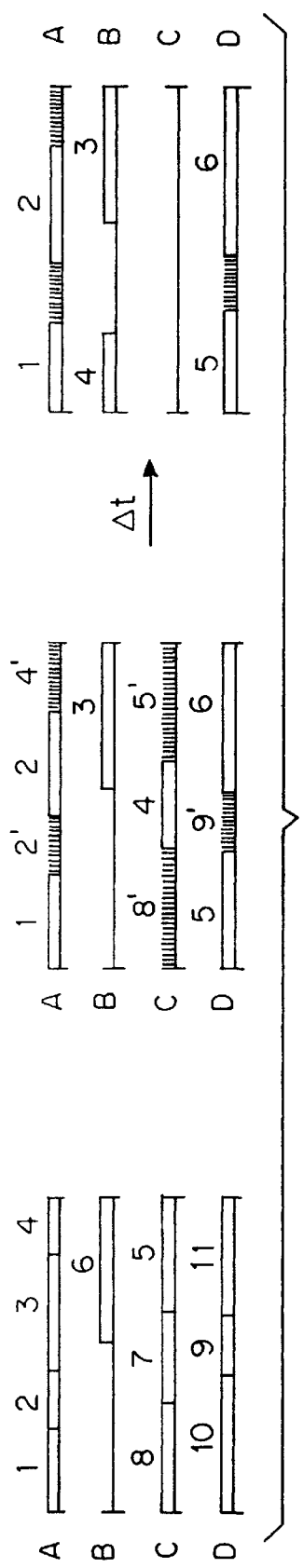
FIG. 3c is an example of copying files to other blocks.

In the following, the copying of files to other blocks is explained by means of FIG. 3c. It is determined which block contains the smallest number of occupied unmarked segments. In this case it is block C. The file 7 located therein, which is unmarked, is copied to the open area of block B (now 4, after the renumbering). The remaining area in block C is marked for erasure, and thus the area is completely open.

Figure 3D:
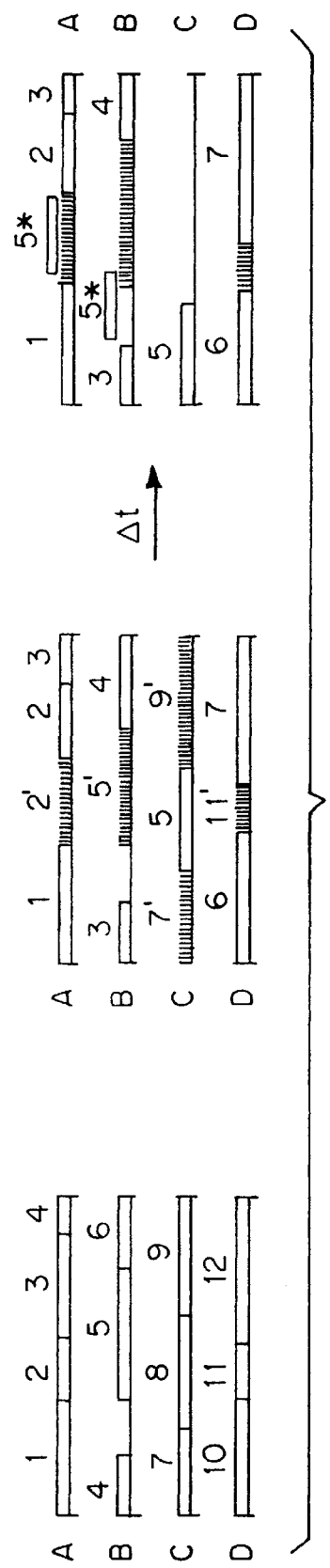
FIG. 3d is an example of the temporary storage of files.

In the following, an example of the temporary storage of files is explained by means of FIG. 3d.

In the present case, the block containing the smallest number of occupied unmarked segments is determined as well. In this case it is block C. To perform the erasure of the block, it is attempted to move file 5 (after renumbering), which is unmarked. There are no more unoccupied areas into which the file can be copied. It is therefore attempted to temporarily store file 5 in the area of file 2 marked for erasure. The position of the temporarily stored file 5 is shown as 5* in FIG. 3d. It is not sufficient, and thus the remaining part of the file e.g. is temporarily stored in block B, in the unoccupied area (between 3 and 5'), but also in the marked area 5'. After that the block C is erased. Then the file 5 is reconstructed in the now "empty" block.

The examples described above are not intended to be exhaustive.

The degree of filling of the flash memory, which is divided into four blocks, is determined by the number of unoccupied segments, the number of occupied segments marked for erasure, and the occupied unmarked segments of each of the four blocks. If the degree of filling exceeds a threshold, and the block containing the smallest number of occupied unmarked segments is determined, the occupied unmarked segments are logically operated on, for overwriting to the segments of a block which are marked for erasure. This logic operation is explained in the following by means of an example. This is based on the fact that an equal probability distribution of 0 and 1 exists particularly with voice data.

In the blocks which contain segments marked for erasure, data are still recorded in the segments marked for erasure. The data can be indicated as follows, in hexadecimal and in binary notation:

TABLE 1

| HEX | BINARY |
| --- | --- |
| 8 3 | 1000 0011 |
| 0 2 | 0000 0010 |
| 0 0 | 0000 0000 |
| B A | 1011 1010 |
| 5 7 | 0101 0111 |
| 1 A | 0001 1010 |
| 0 F | 0000 1111 |
| E D | 1110 1101 |
| 2 2 | 0010 0010 |
| D F | 1101 0101 |
| D 2 | 1101 0010 |
| . | . |
| . | . |
| . | . |

The data of the occupied unmarked segment are for example:

TABLE 2

| HEX | BINARY |
| --- | --- |
| 1 5 | 0001 0101 |

These data are to be overwritten.

In the following, the data of the files marked for erasure are linked (logically operated upon) with the occupied unmarked data by means of a logical linkage, e.g. AND.

HEX   HEX        BINARY        BINARY 8 3   &  1 5  =  1000 0011  &  0001 0101

This results in these linked data:

$$BINARY\ 0000\ 0001 = HEX\ 0\ 1 \tag{I}$$

However, the data have not yet been fully overwritten, since 0000 0001 does not correspond, or only partially to 0001 0101. Accordingly, further logic operations are necessary until the full overwriting has been accomplished.

It follows that a new logic operation, in this case AND as well, is applied to the following data, which are located in the segment marked for erasure.

HEX   HEX        BINARY        BINARY 0 2   &  1 5  =  0000 0010  &  0001 0101

It follows that:

$$BINARY\quad HEX \tag{II}$$
$$0000\ 0000 = 0\ 0$$

which produces no contribution to the overwriting process. And further,

HEX   HEX        BINARY        BINARY 0 0   &  1 5  =  0000 0000  &  0001 0101

Which results in:

$$\begin{array}{cc} \text{BINARY} & \text{HEX} \\ 0000\ 0000 = & 0\ 0 \end{array} \quad (\text{III})$$

And further, $$\begin{array}{cccc} \text{HEX} & \text{HEX} & \text{BINARY} & \text{BINARY} \\ \text{B A} & \&\ 1\ 5 = & 1011\ 1010 & \&\ 0001\ 0101 \end{array}$$

Which results in:

$$\begin{array}{cc} \text{BINARY} & \text{HEX} \\ 0001\ 0000 = & 1\ 0 \end{array} \quad (\text{IV})$$

This to the overwriting process produces a contribution, but together with equations I, II and III still does not correspond to the complete data of 0001 0101.

$$\begin{array}{cccc} \text{HEX} & \text{HEX} & \text{BINARY} & \text{BINARY} \\ 5\ 7 & \&\ 1\ 5 = & 0101\ 0111 & \&\ 0001\ 0101 \end{array}$$

Which results in:

$$\begin{array}{cc} \text{BINARY} & \text{HEX} \\ 0001\ 0101 = & 1\ 5 \end{array} \quad (\text{V})$$

In the following, an overview of the data overwritten so far is provided in table form. The left column contains the data to be overwritten and the center column the data that were overwritten with the logic operation. The two right columns indicate the respective hexadecimal numbers, where the extreme right column indicates the data to be encoded.

In equation (V) the logical operation produces a 1 5=0001 0101.

TABLE 3

| BINARY | | BINARY | HEX | HEX |
|---|---|---|---|---|
| 000_1_ | | | 1 5 | |
| | (I) | 0000 0001 | 0 1 | 1 4 |
| | (II) | 0000 000_0_ | 0 0 | 1 5 |
| | (III) | 0000 0000 | 0 0 | 1 4 |
| | (IV) | 000_1_ 0000 | 1 0 | 0 4 |
| | (V) | 0001 0_1_01 | 1 5 | 0 4 |
| 0001 0101 | | =0001 0101 | | |

However, since a 0 1=0000 0001 was overwritten with equation (I), and a 1 0=0001 0000 with equation (V), in this instance equation (V) only programs a 0 4=0000 0100. In this case, the number of equation (V) is determined by means of a logical OR operation or by subtraction.

It is furthermore necessary to determine an end criterion, in order to establish that the overwriting has ended.

An end criterion could look as follows: the above explained logical operation with the following data marked for erasure results in:

$$\begin{array}{cccc} \text{HEX} & \text{HEX} & \text{BINARY} & \text{BINARY} \\ 1\ \text{A} & \&\ 1\ 5 = & 0001\ 1010 & \&\ 0001\ 0101 \end{array}$$

Which results in:

$$\begin{array}{cc} \text{BINARY} & \text{HEX} \\ 0001\ 0000 = & 1\ 0 \end{array} \quad (\text{VI})$$

If we compare this with the values in table 5, we notice that equation (VI) corresponds to equation (IV). Accordingly, it is established that a 1 is again found at least in one bit position, which serves as the end criterion.

Another example is produced when the occupied unmarked data are as follows, for example:

TABLE 4

| HEX | BINARY |
|---|---|
| 0 0 | 0000 0000 |

Those marked for erasure are for example:

TABLE 5

| HEX | BINARY |
|---|---|
| 0 F | 0000 1111 |
| E D | 1110 1101 |
| . | . |
| . | . |
| . | . |

In the linkage that corresponds to the previously explained, logic operation each data with 00 would lead to 00. For this reason, the end criterion must be expanded. The following must be determined:

TABLE 6

| HEX | BINARY | & | BINARY | HEX | = | |
|---|---|---|---|---|---|---|
| 0 0 | 0000 0000 | | 0000 1_111_ | 0 F | | 0000 0000 |
| | | | 1110 1_101_ | E D | | 0000 0000 |

The bit positions 0, 2 and 3 of the data in the center column contain a 1 in both cases. It is established accordingly that if consecutive bytes each contain more than one bit position containing a 1, it represents a byte of 0 and thus establishes the end criterion.

Another example is provided by the following data marked for erasure (see table 7) and the occupied unmarked data (table 8).

TABLE 7

| HEX | BINARY |
|---|---|
| 2 2 | 0010 0010 |
| D 5 | 1101 0101 |
| D 2 | 1101 0010 |
| . | . |
| . | . |
| . | . |

TABLE 8

| HEX | BINARY |
|---|---|
| 0 0 | 0000 0000 |

The following table shows the results of the logic operation:

TABLE 9

| BINARY | | & | BINARY | |
|---|---|---|---|---|
| 0000 0000 | | | | |
| | (VII) | 0010 0010 | | 0000 0000 |
| | (VIII) | 1101 0101 | | 0000 0000 |
| | (IX) | 1101 0010 | | 0000 0000 |

The dual values of equations (VII) and (VIII) do not have any coinciding bit position with 1, which means that no end criterion has been fulfilled. However, comparing equation (IX) with equation (VIII) again shows coinciding bit positions, which in turn fulfills an end criterion.

In summary, after overwriting, the data of table 1 produce the following:

TABLE 10

| 8 3 | → | 0 1 | | |
|---|---|---|---|---|
| 0 2 | → | 0 0 | | |
| 0 0 | → | 0 0 | | |
| | | | → | for 1 5 |
| B A | → | 1 0 | | |
| 5 7 | → | 0 4 | | |
| 1 A | → | 1 0 | | |
| 0 F | | | | |
| | | | → | for 0 0 |
| E D | | | | |
| 2 2 | → | 0 0 | | |
| D 5 | | | → | for 0 0 |
| D 2 | | | | |

After the block has been erased, the above explained unmarked data overwritten in this manner are preferably reconstructed. The erasure creates a new open storage space and speech can again be recorded.

What is claimed is:

1. A method for operating a flash memory, which is divided into blocks, and where the blocks are subdivided into a plurality of segemnts, wherein
   data are stored in the form of files in segments, and files are marked for erasure in segments, said method comprising the steps of
      for each file marked for erasure, storing information in each segment which contains the data of the file. the information identifying the segment for erasure ,
      determining an up-to-date degree of filling for the flash memory, wherein the number of occupied segments marked for erasure, and the number of unmarked and unoccupied segments are determined for each block, and
      performing a memory optimization after a degree of filling threshold has been exceeded.

2. A method as claimed in claim 1, further comprising the steps of shifting unmarked files in the direction of an unoccupied end of the flash memory, and erasing in blocks the remaining marked files in the blocks.

3. A method as claimed in claim 2, wherein the step of performing a memory optimization further comprises determining whether a block exists in which no occupied unmarked segments are located, and if so, erasing this block.

4. A method as claimed in claim 3, wherein the step of performing a memory optimization further comprises determining in which block the smallest number of occupied unmarked segments is located, copying these segments to unoccupied areas of other blocks, and erasing the previously determined block.

5. A method as claimed in claim 4, wherein the step of performing a memory optimization further comprises determining in which block the smallest number of occupied unmarked segments is located, temporarily storing these segments in a marked area of another block, erasing the previously determined block and reconstructing the temporarily stored data therein.

6. A method as claimed in claim 5, further comprising the step of causing a user inquiry to be made, whereby the user can indicate those data that are to be additionally marked for erasure.

7. A method as claimed in claim 6, further comprising the step of defining a file initiation label and a segment initiation label at the start of each file, and where two segment initiation labels are defined for each other pertinent segment.

8. A method as claimed in claim 7, wherein each file initiation label is occupied by zeros, and said method further comprises the step of identifying the type of stored data using the segment initiation label.

9. A method as claimed in claim 8, further comprising the step of identifying the marked segments by zeros in the segment initiation labels.

10. A method as claimed in claim 1 further comprising the step of inserting additional information at the start of the first segment of each file to identify files of the same type.

11. A memory encoded with executable instructions representing a program module for the operation of a flash memory divided into blocks, and in which blocks are subdivided into a number of segments, the segments comprising information identifying whether a particular segment is to be erased, the executable instructions representing the program module being capable of instructing a computer to determine an allowable degree of flash memory filling by the number of unoccupied, occupied and marked for erasure segments, and by occupied and unmarked segments of each block, and being capable of instructing the computer to perform a memory optimization by means of control commands,
   wherein a first control command causes segments occupied by files to be shifted, and a second control command erases remaining occupied segments which are marked for erasure, and in the event that files cannot be shifted,
   a third control command causes determination of a block in which no occupied and unmarked segments are located, which is then erased, and in the event that no block can be determined in which no occupied and unmarked segments are located,
   a fourth control command causes determination of the block containing the smallest number of occupied unmarked segments and copying of the occupied unmarked segments to unoccupied segments of other blocks, and in the event that occupied unmarked segments cannot be copied to unoccupied segments of other blocks
   a fifth control command causes determination of the block containing the smallest number of occupied unmarked segments and temporary storage of the occupied unmarked segments in marked segments of other blocks, and causes the erasure of the determined block, and causes reconstruction of the occupied unmarked segments and in the event that the block containing the smallest number of occupied unmarked segments cannot be temporarily stored in marked segments of other blocks a sixth control command causes a user inquiry, in which the user can mark files for erasure.

12. In a telephone answering machine, a memory encoded with executable instructions representing a program module for the operation of a flash memory divided into blocks, and in which blocks are subdivided into a number of segments, the segments comprising information identifying whether a particular segment is to be erased, the executable instructions representing the program module being capable of instructing a computer to determine an allowable degree of flash memory filling by the number of unoccupied, occupied and marked for erasure segments, and by occupied and unmarked segments of each block, and being capable of instructing the computer to perform a memory optimization by means of control commands, wherein a first control command causes segments occupied by files to be shifted, and a second control command erases remaining occupied segments which are marked for erasure, and in the event that files cannot be shifted, a third control command causes determination of a block in which no occupied and unmarked segments are located, which is then erased, and in the event that no block can be determined in which no occupied and unmarked segments are located, a fourth control command causes determination of the block containing the smallest number of occupied unmarked segments and copying of the occupied unmarked segments to unoccupied segments of other blocks, and in the event that occupied unmarked segments cannot be copied to unoccupied segments of other blocks a fifth control command causes determination of the block containing the smallest number of occupied unmarked segments and temporary storage of the occupied unmarked segments in marked segments of other blocks, and causes the erasure of the determined block, and causes reconstruction of the occupied unmarked segments and in the event that the block containing the smallest number of occupied unmarked segments cannot be temporarily stored in marked segments of other blocks a sixth control command causes a user inquiry, in which the user can mark files for erasure.

13. A method for optimizing storage space in a flash memory divided into blocks, and where the blocks are subdivided into a plurality of segments, the segments comprising information identifying whether a particular segment is to be erased, wherein after a degree of filling threshold has been exceeded, as determined by the number of occupied segments marked for erasure, and the number of occupied unmarked segments and unoccupied segments of each block, determining the block containing the smallest number of occupied unmarked segments, shifting occupied unmarked segments of this block to segments of another block, which are marked for erasure, using a logic operation to combine the data of the occupied unmarked segments with the data of the segments marked for erasure, erasing the previously determined block containing the smallest number of occupied unmarked segments.

14. A method as claimed in claim 13, wherein the logic operation comprises a logical AND operation between data of the occupied unmarked segments and data in the segments marked for erasure.

15. A method as claimed in claim 13, wherein the logic operation comprises a logic OR operation between data of the occupied unmarked segments and data in the segments marked for erasure.

16. A method as claimed in claim 13, wherein the step of transferring the occupied unmarked segments is performed until an end criterion is fulfilled.

17. A method as claimed in claim 16, wherein the end criterion is fulfilled if at least one bit position of subsequent bytes of the logically combined data contains the same bit value.

18. A method as claimed in claim 17, further comprising the step of reconstructing the shifted data in the previously determined erased block.

19. A memory encoded with executable instructions representing a program module for the operation of a flash memory divided into blocks, and in which blocks are subdivided into a plurality of segments, the segments comprising information identifying whether a particular segment is to be erased, the executable instructions representing the program module being capable of instructing a computer to determine an allowable degree of flash memory filling through the number of unoccupied, occupied and marked for erasure segments, and by occupied and unmarked segments of each block, and being capable of instructing the computer to perform a memory optimization by means of control commands, wherein a first control command causes segments occupied by files to be shifted, and wherein the remaining occupied marked for erasure segments are erased by means of a second control command, and in the event that files cannot be shifted, a block is determined in which no occupied and unmarked segments are located, which is then erased by means of a third control command, and in the event that no block can be determined in which no occupied and unmarked segments are located, a block containing the smallest number of occupied unmarked segments is determined, which are then copied to unoccupied segments of other blocks by means of a fourth control command, and in the event that occupied unmarked segments cannot be copied to unoccupied segments of other blocks, the block containing the smallest number of occupied unmarked segments is determined, which are then temporarily stored in marked segments of other blocks by means of a fifth control command, and are then reconstructed after the determined block has been erased, and in the event that occupied unmarked segments cannot be copied to unoccupied segments of other blocks, the block containing the smallest number of occupied unmarked segments is determined, which are then copied to marked-for-erasure segments of another block, using a logic operation to combine data of the unmarked segments with data of the marked segments by means of a sixth control command, and in the event that the block containing the smallest number of occupied unmarked segments cannot be temporarily stored in marked segments of other blocks, a seventh control command causes a user inquiry, in which the user can mark files for erasure.

* * * * *

UNITED STATES PATENT AND TRADEMARK OFFICE
CERTIFICATE OF CORRECTION

PATENT NO. : 5,933,845
DATED : August 3, 1999
INVENTOR(S) : Kopp et al

It is certified that error appears in the above-identified patent and that said Letters Patent is hereby corrected as shown below:

In the Abstract [57] line 2, "o" should be --or--.
In the Abstract [57] line 14, "may be" should be --is--.

In column 9, claim 1, line 3, "segemnts" should be --segments--.
In column 9, claim 1, line 8, "file." should be --file,--.

Signed and Sealed this

Eighth Day of February, 2000

Attest:

Q. TODD DICKINSON

Attesting Officer

Commissioner of Patents and Trademarks